United States Patent [19]

Müller et al.

[11] Patent Number: 5,961,906
[45] Date of Patent: Oct. 5, 1999

[54] BIODEGRADABLE AND COMPOSTABLE PLASTIC ARTICLES, INCLUDING FLAT-SHAPED ARTICLES

[75] Inventors: Hanns-Peter Müller, Odenthal; Jochen Kalbe, Leichlingen; Rainhard Koch, Köln, all of Germany

[73] Assignee: Bayer Aktiengesellschaft, Leverkusin, Germany

[21] Appl. No.: 08/952,153

[22] PCT Filed: Apr. 29, 1996

[86] PCT No.: PCT/EP96/01780

§ 371 Date: Nov. 4, 1997

§ 102(e) Date: Nov. 4, 1997

[87] PCT Pub. No.: WO96/35733

PCT Pub. Date: Nov. 14, 1996

[30] Foreign Application Priority Data

May 11, 1995 [DE] Germany .......................... 195 17 185

[51] Int. Cl.$^6$ .............................. B27N 3/00; B28B 11/18; B29C 39/14; B29C 43/22
[52] U.S. Cl. .................... 264/109; 264/165; 264/172.11; 264/177.13; 264/178 F; 264/555; 428/227; 428/357; 524/47; 524/590; 524/591; 524/839; 524/840; 524/507

[58] Field of Search ............................... 524/47, 590, 591, 524/839, 840, 507; 264/555, 109, 165, 172.11, 177.13, 178 F; 428/221, 357

[56] References Cited

U.S. PATENT DOCUMENTS

| | | |
|---|---|---|
| 4,237,264 | 12/1980 | Noll et al. . |
| 5,061,777 | 10/1991 | Yoda et al. ................................ 528/61 |
| 5,310,782 | 5/1994 | Takiyama et al. . |
| 5,496,909 | 3/1996 | Mühfeld et al. . |

FOREIGN PATENT DOCUMENTS

| | | |
|---|---|---|
| A-593 975 | of 0000 | European Pat. Off. . |
| 1 336 050 | 11/1973 | United Kingdom . |

OTHER PUBLICATIONS

T. Jopski, Biologisch abbaubare Kunststoffe 83 (1993) 10.

*Primary Examiner*—Patrick D. Niland
*Attorney, Agent, or Firm*—Joseph C. Gil; N. Denise Brown

[57] ABSTRACT

The use of dispersions of polyurethanes containing urea groups and based on selected starting materials, optionally via the intermediate stage of granules obtained by spray drying the dispersions, for the production of fully biodegradable shaped bodies.

5 Claims, No Drawings

BIODEGRADABLE AND COMPOSTABLE PLASTIC ARTICLES, INCLUDING FLAT-SHAPED ARTICLES

The invention relates to the use of aqueous dispersions of selected polyurethanes, containing urea groups, for the production of biodegradable and compostable shaped bodies, including sheet structures, optionally via the intermediate stage of granules prepared from the dispersions by spray drying.

Fully biodegradable and compostable plastics will in the future acquire ever greater economic and technical importance (T. Jopski, Kunststoffe 83 (1993) 10). The major challenge is to produce plastics which have the necessary functionality yet degrade under the stimulation of a biologically active environment. The initiating factor may be microbiological, hydrolytic or oxidative degradation at a specific site in the main chain of the polymer. All degradation products must be safe, non-toxic and non-accumulable in nature, i.e. must be subject to complete microbial degradation. To date, three general categories of the abovementioned materials have become known: polyester-like polymers, plastics based on naturally occurring polymers, and other degradable plastics, for example polyvinyl alcohol. The polyester-like polymers include polylactic acid, polyhydroxybutyrate, polyhydroxyvalerate, polycaprolactone and high molecular weight aliphatic polyesters (EP-A-0 572 256, 1993). In order to obtain sufficiently high molecular weights, the polyesters specified in EP-A-0 572 256 are extended with organic diisocyanates to form the end product. The use of thermoplastic poly-(esterurethanes) as compostable plastics is described in EP-A-0 593 975.

Biodegradable thermoplastic polyurethane filaments are described in DE-C-4 319 439. The thermoplastically processable polyurethanes are linear and, accordingly, have difunctional polyesterdiols and difunctional polyethylene glycols built into the polymer chain, and are built up using hexamethylenediisocyanate and butanediol or hexanediol as chain extenders (Examples 1 to 3, DE-C-4 319 439).

Degradable shaped bodies or sheet structures comprising polyurethanes which contain urea groups have not hitherto been disclosed. The use, according to the invention, as described below in more detail, of aqueous dispersions of selected polyurethanes which contain urea groups shows a simple route to such plastics.

The invention relates to the use of aqueous dispersions of polyurethanes which contain urea groups, optionally via the intermediate stage of granules obtained by spray drying the dispersions, for the production of fully biodegradable shaped bodies, including sheet structures, especially coatings on any substrates, characterized in that, as polyurethanes which are dispersed in water and contain urea groups, use is made of reaction products which are prepared by known methods, observing a ratio of equivalents of isocyanate groups to isocyanate-reactive groups of from 1:1 to 2:1, from a) a diisocyanate component consisting of
a1) hexamethylene diisocyanate or
a2) mixtures of hexamethylene diisocyanate with a total of up to 60% by weight, based on the mixture, of 1-isocyanato-3,3,5-trimethyl-5-isocyanatomethyl-cyclohexane and/or 4,4'-diisocyanatodicyclohexylmethane and/or 1-methyl-2,4 (6)diisocyanatocyclohexane, with
b) a diol component consisting of
b1) at least one polyesterdiol with a molecular weight, which can be calculated from the hydroxyl content, of from 500 to 10,000 of (i) adipic acid and/or succinic acid and (ii) at least one alkanediol having 2 to 6 carbon atoms, or
b2) a mixture of such polyesterdiols with up to 32% by weight, based on the total weight of component b), of alkanediols having 2 to 6 carbon atoms and optionally containing ether groups,
c) a diamine component in a quantity of from 2 to 50 equivalent-%, based on the total quantity of the isocyanate-reactive groups present in components b) and c), consisting of
c1) diaminosulphonates of the general formula

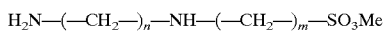

or
c2) mixtures of diaminosulphonates c1) with up to 70% by weight, based on the total weight of component c), of ethylenediamine, and optionally
d) hydrophilic polyether alcohols of the general formula

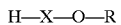

in a quantity of up to 10% by weight, based on the total weight of components b), c) and d), and also, optionally,
e) water, which is not included in the calculation of the ratio of equivalents of isocyanate groups to isocyanate-reactive groups,
where in the abovementioned general formulae
m and n independently of one another represent numbers from 2 to 6,
Me represents potassium or sodium,
R represents a monovalent hydrocarbon radical having 1 to 12 carbon atoms, and
X denotes a polyalkylene oxide chain with a molecular weight range from 88 to 4000, at least 40% of whose alkylene oxide units consist of ethylene oxide units while the remainder consist of propylene oxide units.

Aqueous dispersions of polyurethanes which contain urea groups and which have a constitution similar to or comparable with that of the polyurethanes according to the invention are known from DE-A 2 035 732 and DE-A 2 651 506, respectively. These prior publications, however, lack any reference whatsoever to the possibility of producing biodegradable and compostable shaped bodies or regarding the necessary selection of the starting materials which are to be employed in preparing the polyurethanes in order to obtain the desired effect of biodegradability and compostability.

The term "shaped bodies" as used in the context of the invention is intended also to comprise sheet structures such as, in particular, surface coatings or adhesive layers.

The shaped bodies which are obtainable in accordance with the invention are fully biodegradable. In the context of the invention this means that test films with a thickness of from 0.05 to 0.5 mm which have been prepared for example by drying a dispersion to be used in accordance with the invention on a substrate or by thermoplastic shaping of granules produced from shaped bodies according to the invention perform at least as well, in the film composting test described below, as a corresponding cellulose film. Another consequence of this complete biodegradability is, of course, the complete compostability of the shaped bodies.

The term "aqueous dispersion" as used in the context of the invention is intended also to comprise aqueous solutions, which may exist when the concentration of hydrophilic centres in the urea group-containing polyurethanes is sufficiently high to ensure solubility in water. The dispersions to be used in accordance with the invention are often aqueous systems which comprise both dispersed and dissolved polyurethanes containing urea groups.

In preparing the aqueous dispersions, the abovementioned starting materials a), b), c) and, if used, d) and/or, if used, e) are employed in the quantitative ratios mentioned.

The diisocyanate component a) preferably consists exclusively of hexamethylene diisocyanate.

The diol component b) consists either of b1) at least one polyesterdiol or b2) a mixture of at least one polyesterdiol b1) with up to 32% by weight, preferably up to 10% by weight, of at least one alkanediol having 2 to 6 carbon atoms and optionally containing ether groups.

Suitable polyesterdiols b1) are those which have a molecular weight, which can be calculated from the hydroxyl content, of from 500 to 10,000, preferably from 1000 to 2500, and are based on (i) adipic acid and/or succinic acid and (ii) alkanediols having 2 to 6 carbon atoms and optionally containing ether groups, such as, for example, ethylene glycol, diethylene glycol, 1,4-butanediol, neopentylglycol and/or 1,6-hexanediol. Polyesterdiols which have been prepared using exclusively ethylene glycol and/or 1,4-butanediol as diol component are particularly preferred.

The alkanediols which have 2 to 6 carbon atoms and which optionally contain ether groups and which are to be used, if desired, as hydroxyl-containing chain extenders are those of the kind just mentioned above by way of example.

The diamine component c) consists either of c1) diaminosulphonates of the abovementioned general formula or of c2) mixtures of such diaminosulphonates with ethylenediamine which is employed, if at all, in quantities of up to 90 equivalent-%, preferably up to 70 equivalent-%, based on the isocyanate-reactive amino groups of component c). Diaminosulphonates to which very special preference is given are the potassium or sodium salts of N-(2-aminoethyl)-2-aminoethanesulphonic acid.

The diamine component c) is used in general in a quantity of from 1 to 10% by weight, preferably from 2 to 5% by weight, based on the weight of component b).

The optional structural component d) comprises hydrophilic, monohydric polyether alcohols of the general formula

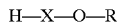

in which

R and X have the meaning already given above.

Preference is given to those among such polyether alcohols for which

R represents an aliphatic hydrocarbon radical having 1 to 4 carbon atoms, and

X represents a polyalkylene oxide chain with a molecular weight range from 500 to 4000, in which at least 40%, in particular at least 70% and, with particular preference, 100% of the alkylene oxide units present are ethylene oxide units and the remaining alkylene oxide units are propylene oxide units.

Monohydric polyether alcohols of this kind are prepared by the alkoxylation, which is known per se, of suitable starter molecules R—OH, for example methanol, n-butanol, n-hexanol or n-dodecanol, with the preferred use of ethylene oxide and optionally propylene oxide, in quantitative ratios of the alkylene oxides which correspond to the comments made above. In this context, the alkylene oxides mentioned can be employed as a mixture and/or in succession.

In the process according to the invention the monohydric polyether alcohols d) are employed, if at all, in quantities of up to 10% by weight, preferably up to 3% by weight, based on the total weight of components b), c) and d).

A further, optional structural component in preparing the urea group-containing polyurethanes is e) water, a reactant which is to be considered in particular when the chain extension reaction of previously prepared NCO prepolymers, which is the last stage to be carried out in the preparation of the polyurethanes, is performed in an aqueous medium, and especially when the diamines c) dissolved in the water are employed in quantities which are less than equivalent to the NCO groups of the NCO prepolymers.

In addition to these structural components, other compounds suitable in principle are trifunctional compounds in minor amounts, for example glycerol or trimethylolpropane, which can either be incorporated into the polyesters b1) in small quantities or be employed in free form as part of component b2). The use of such branching molecules must in general be compensated by means of monofunctional compounds so that, purely arithmetically, linear polymers again result.

The polyurethanes containing urea groups can be prepared from the structural components listed as examples by any desired processes of the prior art. Preferably, however, the known prepolymer process is employed, in which specifically an NCO prepolymer or semi-prepolymer is prepared from components b) and optionally d) and from diisocyanate component a), observing a ratio of NCO/OH equivalents of from 1.5:1 to 4:1, preferably from 1.8:1 to 2.5:1, and then reacting this prepolymer or semi-prepolymer with component c) to effect chain extension.

In this process, the prepolymer or semi-prepolymer is generally prepared without solvent at temperatures from 20 to 150° C. and is then dissolved in a suitable solvent. It is of course also possible to form the prepolymers or semi-prepolymers directly in a solvent. Particularly suitable solvents are solvents which are inert towards isocyanate groups and are of unlimited miscibility with water. Acetone is the preferred solvent used.

The prepolymers or semi-prepolymers thus prepared are reacted, in the second reaction stage, with component c), to effect chain extension. In this stage, the ratio of equivalents of isocyanate groups of the prepolymers or semi-prepolymers on the one hand to isocyanate-reactive amino groups of component c) on the other hand is from 1:1 to 20:1, preferably from 1.2:1 to 4:1. The chain extension reaction can be performed in solution, preferably in solution in acetone or else in an aqueous medium, in such a way that the solution of the prepolymers or semi-prepolymers in organic solvent is combined with a solution of component c) in water, with thorough mixing. As already indicated, this may be accompanied by a chain extension reaction, by reaction of the NCO groups of the prepolymers or semi-prepolymers with the water. In the abovementioned and preferred 2-stage preparation of the urea group-containing polyurethanes, the ratios of equivalents between isocyanate groups and isocyanate-reactive groups of the two reaction stages are chosen, within the scope of the disclosure made, such that the overall ratio of isocyanate groups to isocyanate-reactive groups of components b) to d) corresponds to the ratio of from 1:1 to 2:1 given above. The water is absolutely excluded from the calculation of the ratios of equivalents specified.

The chain extension reaction takes place in general within the temperature range from 20 to 50° C.

A possibility in principle, but in no way preferred, is the alternative of carrying out the chain extension reaction in the melt, i.e. in the absence of solvents and water (melt dispersion process).

To prepare the dispersions to be used in accordance with the invention, the chain-extended polyurethanes or their solutions in organic solvents if the chain extension reaction has been carried out in the absence of water are mixed with the dispersion water, followed if appropriate by the distillative removal of at least part of the auxiliary solvent optionally used. If the chain extension reaction is performed in an aqueous medium, it is possible to add further water if appropriate in order to prepare the aqueous dispersions. In this case too, it is of course possible to remove the auxiliary solvent used by distillation, if desired.

In general, the overall quantity of water employed is measured so as to give from 25 to 50% by weight dispersions, based on the dispersed solids on the one hand and the continuous phase on the other hand.

The dispersions to be used in accordance with the invention can be used to prepare fully biodegradable and compostable shaped bodies. This use can be implemented either by direct application of the dispersions or via the intermediate stage of granules produced from the dispersions by spray drying beforehand.

With regard to the direct use of the dispersions, according to the invention, mention may be made for example of their use as coating material for the coating of any desired substrates, as adhesive and/or as binder for cellulose and water-soluble or water-swellable starch, for producing tiles from cotton and/or hemp or flax, as a polymeric binder for wood, sawdust or wood chips, as films in composite materials for the production of biodegradable packaging, for the production of sanitary articles, for example nappies, as seed dressing for fixing active substances as slow-release formulations, as a binder for the production of plant pots, as coatings for paper and for the engine sizing of paper, for the production of sausage skins and for the production of cosmetic compositions.

Granules which are obtained in a manner known per se by spray drying the dispersions to be used in accordance with the invention, and which generally have a mean particle diameter of from 1 to 3 mm, constitute thermoplastically processable plastics which can be processed as thermoplastics in a manner known per se at from 120 to 240° C. to produce fully biodegradable and compostable shaped articles, for example flat films, injection-moulded articles, such as flowerpots, drinking vessels, table bowls, thermoformed articles, blister packages, blown films or bottles. The shaped articles produced in this way are distinguished, moreover, by outstanding mechanical strength.

The invention therefore additionally relates to biodegradable shaped articles, fibres, films and coatings made from the polyurethane which is described above and contains urea groups.

The invention relates, furthermore, to biodegradable shaped bodies comprising

I. from 50 to 99 parts by weight of cellulose (optionally in fibre form, for example cotton, flax, hemp, linen, ramie), water-soluble or water-swellable starch, wood (including sawdust and wood chips), paper (including card), peat and/or compost, and II. from 50 to 1 part(s) by weight of the polyurethane which is described above and contains urea groups.

In the shaped bodies, component II can function as binder, adhesive or coating. In the examples which follow, all percentages are by weight.

EXAMPLES

Test Methods

Biodegradability: The biodegradability of the polyurethanes described in the following examples was determined by the following procedure:

Film Composting Test

The films to be tested were first dried to constant weight at 80° C. and then clamped into 6×6 slide frames. Compost from a composting unit was placed in plastic dishes to a height of 2 cm, and the films were placed therein. The filled boxes were incubated in an incubator for 4 weeks in each case, in succession, at 60, 50 and 37° C. Losses of water were determined by the weight loss and were made up. During incubation, the pH of the compost was measured once a week. After 4 weeks in each case, a batch was terminated and the films were removed, cleaned, dried to constant weight at 80° C. and photographed. Directly after drying, the weight loss of the film was determined by weighing again.

In the poisoned control, the compost was dried at 105° C. and the water which had evaporated was then replaced by a 1% strength $HgCl_2$ solution. Before being introduced into the compost mixture, the films for the poisoned control were placed in the $HgCl_2$ solution, dried and then introduced into the poisoned compost. The control batch was incubated in the same way as for the other batches.

A plastic was classified as degradable if a film produced therefrom disappeared completely in the microbially active batches just the same as the cellulose film employed in a parallel test, and was preserved in the poisoned control.

Headspace Test 10 g of thoroughly rotted compost (based on dry weight) from a composting unit were mixed very thoroughly with from 1 to 2 g of polymer. The polymer/compost mixture was then wetted and again thoroughly mixed. The target final water content of the polymer/compost mixture was from about 45 to 55%. The polymer/compost mixture was placed in a vessel with a capacity of one liter, which was to be sealed gas-tight and from which a gas sample was to be removed via a septum. In control batches, the same quantity of compost was employed without polymer. After placing the polymer/compost mixture into the bottles, these were treated with pure $O_2$ for the degradation for from 20 to 30 minutes. After gas treatment, the bottle was sealed gas-tight and the water loss which occurs during gas treatment was made up by injecting distilled $H_2O$ through the septum. To simulate rotting conditions, the bottles were incubated at 55° C.

At intervals of from one to two weeks the $CO_2$ formed was determined by gas chromatography; after the gas measurement, gas treatment was carried out again. The percentage degradation can be determined from the quantity of $CO_2$ formed and the carbon content of the polymer.

A plastic was classified as degradable in this test if its degradation corresponded in terms of rate and extent to that of cellulose.

Controlled Composting Test

The controlled composting test was carried out in accordance with DIN test screen part 4 (DIN FNK AA 103.3).

Up to 100 g of finely ground polymer material were mixed with 1000 g of compost (degree of rotting 4) from a composting unit. The mixture was placed in vessels with a volume of 3 l and was treated continuously with air via a gas inlet. The vessels were thermostatted at 58° C. At the gas outlet, the concentration of $CO_2$ was measured continuously via an IR detector, and the flow rate of the gas was also determined. From the two values it was possible to calculate the quantity of $CO_2$ formed. By correction against a control without polymer, the degree of degradation could be determined.

A plastic was classified as degradable in this test if its degradation corresponded in terms of rate and extent to that of cellulose.

Example 1

83.4 g of a polyester made from adipic acid, ethanediol and 1,4-butanediol in an ethanediol:butanediol weight ratio of 1.4:1, of mean molecular weight 2000, and 3 g of a monohydric polyether alcohol of mean molecular weight 2240, prepared by alkoxylation of n-butanol using a mixture of propylene oxide and ethylene oxide in a PO:EO molar ratio of 1:7.1, are degassed together under vacuum at 120° C. for 30 minutes. Under nitrogen, 0.1 g of benzoyl chloride and 13.7 g of hexamethylene diisocyanate are added to the batch in one go. After stirring at 120° C. for 1 hour, the NCO content is 2.84%. The prepolymer is dissolved at 50° C. in 300 g of acetone, and a mixture of 4.8 g of a 50% strength aqueous solution of the sodium salt of N-(2-aminoethyl)-2-aminoethanesulphonic acid (AAS salt), 1.15 g of ethylenediamine and 20 g of water is added at room temperature. After 15 minutes, 230 g of water are added and the acetone is removed at 60° C. and 140 mbar. The distillation residue comprises 337 g of a thinly liquid, white dispersion containing 30% by weight of polyurethane-polyurea.

A sample of the dispersion is dried on a glass plate. A clear, tack-free film is obtained with an elongation at break of more than 300%. The layer thickness is 0.25 mm.

The film was completely degraded in the film composting test within 8 weeks. In the headspace test, 85% of the carbon from the test material employed had been converted to $CO_2$ after 90 days.

Example 2

81.5 g of the polyesterdiol according to Example 1 and 2.9 g of the monohydric polyether alcohol according to Example 1 are degassed together under vacuum at 120° C. for 30 minutes. Under nitrogen, 0.1 g of benzoyl chloride and, in one go, a mixture of 6.7 g of hexamethylene diisocyanate and 8.8 g of isophorone diisocyanate are added to the batch. After stirring at 100° C. for 1 hour, the NCO content is 3.05%. The prepolymer is dissolved at 50° C. in 300 g of acetone, and a mixture of 4.8 g of a 50% strength aqueous solution of AAA salt, 1.36 g of ethylenediamine and 20 g of water is added with rapid stirring at room temperature. After 15 minutes, 230 g of water are added and the acetone is removed at up to 50° C. and 120 mbar. The distillation residue comprises 362 g of a 29.6%, thinly liquid, white dispersion.

A sample of the dispersion is dried on a glass plate to give a clear film 0.25 mm thick whose elongation at break is more than 300%.

In the film composting test, degradation took place within 3 months.

Example 3

170 g of a polyesterdiol of molecular weight 1700 made from adipic acid and a mixture of 1,6-hexanediol and neopentylglycol in a weight ratio of 1.9:1 are degassed under vacuum at 120° C. for 60 minutes. Under nitrogen, 0.2 ml of benzoyl chloride and, in one go, 30.1 g of hexamethylene diisocyanate are added to the batch. After stirring at 120° C. for 30 minutes, the NCO content is 3.2%. The prepolymer is dissolved at 50° C. in 500 g of acetone, the solution is cooled to room temperature, and a mixture of 9.7 g of a 50% strength aqueous solution of AAS salt, 1.51 g of ethylenediamine and 20 g of water is added with rapid stirring to the solution in acetone. After stirring for 15 minutes, 300 g of water are added and the acetone is removed at up to 60° C. and 140 mbar. The distillation residue comprises 505 g.

After dilution with 11 g of water, a 40%, thinly liquid, white polyurethane urea dispersion is obtained.

A sample of the dispersion is diluted with water, cast onto a glass plate and dried. A clear, tack-free film is obtained which has an elongation at break of more than 200%. The layer thickness is 0.25 mm.

In the film composting test, degradation took place within 2 months. In the controlled composting test in accordance with DIN test screen part 4 (DIN FNK AA 103.3), 90% conversion to $CO_2$ took place within 55 days. In the headspace test, 85% conversion to $CO_2$ took place within 87 days.

Example 4 (Comparison Example)

200 g of a polyesterdiol of molecular weight 2000 made from phthalic acid and ethanediol are degassed under vacuum at 120° C. for 30 minutes. Under nitrogen, 0.3 ml of benzoyl chloride and, in one go, 30.2 g of hexamethylene diisocyanate are added to the batch. After stirring at from 120° C. to 140° C. for 40 minutes, the NCO content is 2.65%. The prepolymer is dissolved at 50° C. in 500 g of acetone, and a mixture of 27.4 g of a 50% strength aqueous solution of AAS salt and 50 g of water is added with vigorous stirring at room temperature. After stirring for 10 minutes, 509 g of water are added and the acetone is removed at up to 50° C. and 140 mbar. The distillation residue comprises 781 g. After dilution with 28 g of water, a 30%, thinly liquid, white polyurethane urea dispersion is obtained.

A sample of the dispersion is dried on a glass plate to give a clear, tack-free film with a layer thickness of 0.25 mm.

In the film composting test, no degradation was observed.

We claim:

1. A method of production of fully biodegradable shaped bodies, including sheet structures, wherein the shaped bodies are made from a polyurethane as its aqueous dispersion or from granules, obtained by spray drying said dispersions, wherein the polyurethane contains urea groups and is the reaction product which is prepared by known methods, observing a ratio of equivalents of isocyanate groups to isocyanate-reactive groups of from 1:1 to 2:1, from a) a diisocyanate component consisting of:
   a1) hexamethylene diisocyanate, or
   a2) mixtures of hexamethylene diisocyanate with a total of up to 60% by weight, based on the mixture, of 1-isocyanato-3,3,5-trimethyl-5-isocyanatodicyclohexyl-methane and/or 4,4'diisocyanatodicyclohexylme-thane and/or 1-methyl-2,4(6)diisocyanatocyclohexane, with b) a diol component consisting of:
   b1) at least one polyesterdiol with a molecular weight, which can be calculated from the hydroxyl content, of from 500 to 10,000, which is the reaction product of (i) adipic acid and/or succinic acid, and (ii) at least one alkanediol having from 2 to 6 carbon atoms, or
   b2) a mixture of such polyesterdiols with up to 32% by weight, based on the total weight of component b), of alkanediols having from 2 to 6 carbon atoms and which optionally contain ether groups, c) a diamine component in a quantity of from 2 to 50 equivalent-%, based on the total quantity of the isocyanate-reactive groups present in components b) and c), consisting of:

c1) diaminosulfonates of the general formula:

or c2) mixtures of diaminosulfonates c1) with up to 90% by weight, based on the total weight of component c), of ethylenediamine, and, optionally, d) hydrophilic polyether alcohols of the general formula:

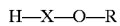

in a quantity of up to 10% by weight, based on the total weight of components b), c) and d), and, optionally, e) water, which is not included in the calculation of the ratio of equivalents of isocyanate groups to isocyanate-reactive groups, wherein in the above mentioned general formulae:

m and n: each independently represent a number from 2 to 6;

Me: represents potassium or sodium;

R: represents a monovalent hydrocarbon radical having 1 to 12 carbon atoms;

and

X: denotes a polyalkylene oxide chain with a molecular weight in the range of from 88 to 4,000, in which at least 40% of the alkylene oxide units consist of ethylene oxide units, with the balance consisting of propylene oxide units.

2. The method of claim 1, wherein the aqueous dispersions of polyurethanes comprise polyurethanes which have been prepared in a two-stage reaction by (1) reacting the starting components a), b), and, optionally d), at a ratio of NCO:OH equivalents of from 1.5:1 to 4:1, to form an NCO prepolymer, and then (2) reacting this NCO prepolymer via chain extension with an aqueous solution of component c).

3. The method of claim 1, wherein the aqueous dispersions of polyurethanes comprise polyurethanes prepared from a) diisocyanate component consisting of:
   a1) hexamethylene diisocyanate;
b) a diol component consisting of:
   b1) at least one polyesterdiol prepared from adipic acid and an alkanediol having from 2 to 6 carbon atoms, and c) a diamine component consisting of:
   c1) the potassium and/or sodium salts of N-(2-aminoethyl)-2-aminoethanesulfonic acid, or
   c2) mixtures of the salts c1) with ethylene diamine.

4. Biodegradable shaped articles, fibres, films and coatings made from the polyurethane defined in claim 1 and containing urea groups.

5. Biodegradable shaped bodies comprising
   I. from 50 to 99 parts by weight of cellulose, water-soluble or water-swellable starch, wood, paper, peat and/or compost, and
   II. from 50 to 1 part(s) by weight of the polyurethane which is defined in claim 1 and contains urea groups.

* * * * *